G. H. WILLIAMS.
SPRING WHEEL.
APPLICATION FILED MAR. 25, 1908.
961,278.  Patented June 14, 1910.
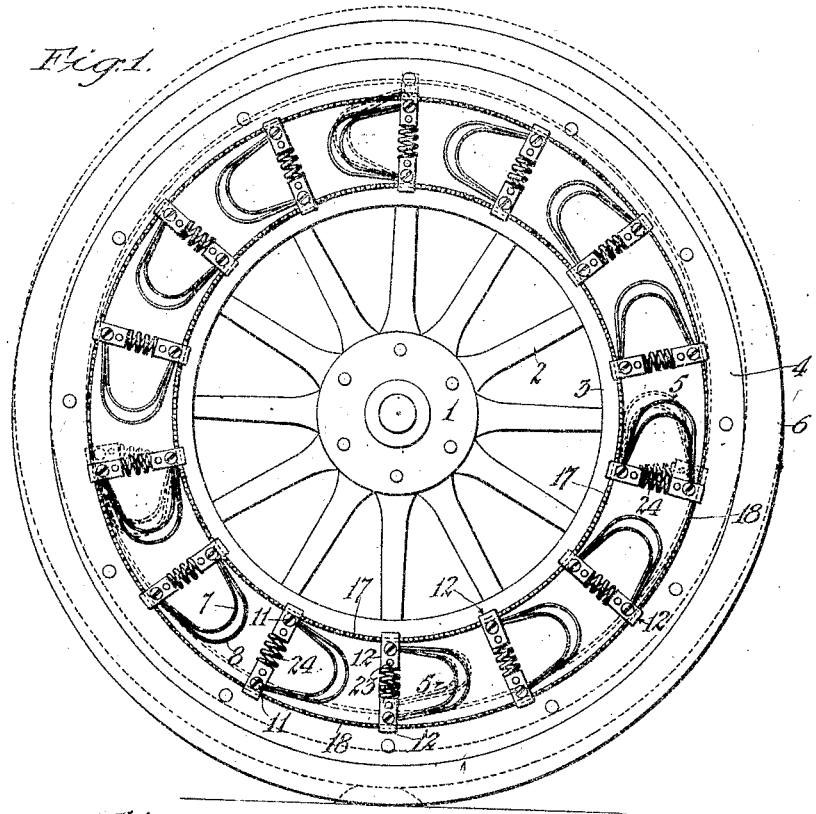
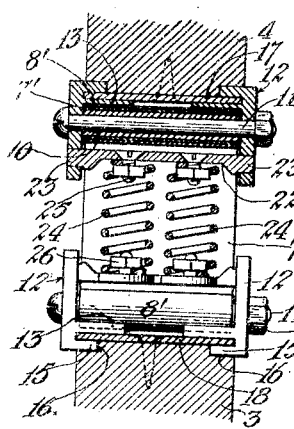
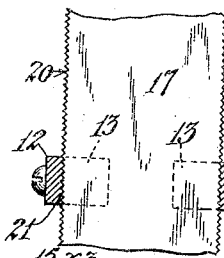
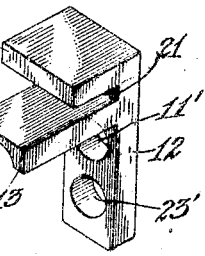
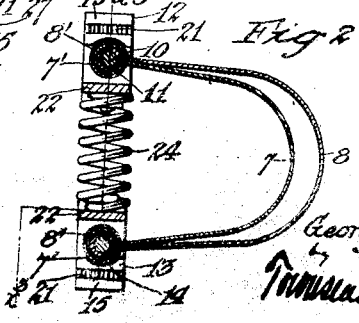
Inventor
George H. Williams

UNITED STATES PATENT OFFICE.

GEORGE H. WILLIAMS, OF LOS ANGELES, CALIFORNIA.

SPRING-WHEEL.

961,278.      Specification of Letters Patent.      Patented June 14, 1910.

Application filed March 25, 1908. Serial No. 423,267.

To all whom it may concern:

Be it known that I, GEORGE H. WILLIAMS, a citizen of the United States, residing at Los Angeles, in the county of Los Angeles and State of California, have invented a new and useful Spring-Wheel, of which the following is a specification.

This invention relates to spring wheels, particularly for use with automobiles where great strength and durability are required together with a high degree of elasticity.

One object of the invention is to provide a spring wheel with means for attaching the springs in such manner that they will automatically adjust themselves, so as to prevent binding or twisting of the parts, and to equalize the strain on all the members.

Another object of the invention is to provide a unit construction whereby spring members may be applied as units in the wheel and may be removed and replaced at will.

In the accompanying drawings: Figure 1 is a side elevation of the wheel. Fig. 2 is a cross section of a spring portion thereof. Fig. 3 is a section on line $x^3$—$x^3$ in Fig. 2. Fig. 4 is a plan of a portion of the band for holding the spring members, showing in section the clamping devices for securing said members. Fig. 5 is a perspective of one of said clamping devices.

Referring more particularly to the drawings, which are for illustrative purposes only and, therefore, are not drawn to any particular scale; 3 and 4 indicate the two rims of a wheel between which are placed a plurality of my improved flexible or yielding elements or units 5. The outer rim 4 is preferably provided with a suitable tire 6 as of rubber or any yielding material and the inner rim is provided with the usual hub 1 and spokes 2.

Spring units or devices 5 are preferably formed with a bow or U-shaped portion and a straight connecting portion between the arms of the bow portion. The bow is formed from a plurality of flat springs 7 and 8 placed within each other, two such springs being shown in the drawing. Clamps 12 are provided for fastening the spring devices to the rims 3 and 4, said rims being preferably provided with rim plates or flanges to which the said clamps are secured.

The rim plates or flanges are preferably formed from thin strips of metal 17 and 18, respectively, which are secured to the rims in any suitable manner. Where the strips of metal have their edges substantially even with the sides of the rims, as shown in the drawings, the rims are recessed as shown at 16 into which the projecting portions 15 of the clamps project when the clamps are in position. The clamps are also provided with inwardly extending portions 13 between which and the projections 15 recesses are formed for the reception of the edges of said strips of material. The units are held against longitudinal movement upon said flanges 17 and 18 preferably by notching or shouldering the edges of the strips of metal, as shown at 20 to form a circular series of shoulders, and also recessing or shouldering the clamps at the bottom of each recess between the projections 13 and 15 as shown at 21.

The clamps are held in position upon the ends of the bows or springs 7 and 8 by means of a bolt 11 that is passed through suitable perforations 11' in the clamps and also through a bushing sleeve 10 that engages with its ends against the inner faces of the clamps, a nut 27 on the end of the bolt holding the parts in their rigid or fixed position. The springs 7 and 8 are secured to or connected with the clamps 12 in any suitable manner, preferably, by forming sleeves 7' and 8' respectively which fit over the sleeves 10 and over each other, as clearly shown in Fig. 2. The sleeve 10 is preferably made a trifle longer than the width of the sleeves 7' and 8' so that said sleeves 7' and 8' will be free to rock or turn upon the sleeve 10 at any time. The inner face of the inner projection 13 is preferably slightly recessed, as shown at 14, to prevent said projections from engaging with the outer sleeve 8'.

The springs 24 which form the main portion of the straight portion of the spring units are flexibly connected at their ends with the clamps 12 as by means of a flat faced pivot bar 22 having its ends formed into pivots 23 which are adapted to rock freely in perforations 23' of the clamps 12. Each spring 24 is held against its respective bar 22 by means of a bolt 25 and nut 26, so as to act expansively as well as compressibly in the operation of the invention. Each spring 24 is thereby rigidly connected with the bar 22 at each end thereof so that the spring and the end bars 22 act as a single elastic member rocking or tilting on the rims in such manner that any buckling or lateral distortion of the springs is avoided and the liability to deterioration or breakage thereof is reduced to a minimum. The springs 7, 8 and 24 with their connecting devices 22, 12, 11, etc., form a unitary self-contained means removable from and replaceable on the wheel as a whole and acting when so applied to the wheel as a unitary spring device.

The means for supporting the bow spring means and the straight spring means with pivotal relation to the rims, comprises, in the present embodiment, the clamp devices 12 and the pivots 11 and 23 for the said spring means. Said clamp devices 12 constitute lugs mounted on the rims.

In using my invention any suitable number of units are arranged around the wheel, as shown in Fig. 1, between the inner and outer rims with the clamps 12 of each unit in radial alinement. The strength of the units is such that normally the springs will be able to hold said rims substantially in their normal position, but in case of an increase of load or in case of the wheel passing over an obstruction, the outer rim being rigid will be moved bodily upward relatively to the hub and inner rim, as indicated in dotted lines in Fig. 1. This upward movement will cause the lower springs to be compressed and the upper ones to be expanded, while the intermediate ones, or those at what might be called the sides of the wheel, will be distorted or bent in different directions with the clamps at the ends of each unit being moved to a greater or less degree out of their normal radial alinement, those substantially even with the hub of the wheel having the outer clamps carried upward relatively to the inner clamps, as indicated in dotted lines in said Fig. 1. This movement of the clamps relatively to each other will cause the ends of the springs 24 to be moved relatively to each other or to stand at a greater or less angle with said clamps owing to the amount of movement of said clamps relatively to each other. This relative movement of the clamps and the springs 24 is readily permitted by the pivots 23 on the bars 22 rocking slightly within the perforations 23' in the clamp 12. By constructing a wheel in this manner it is evident that in addition to partially sustaining the inward and outer compression, caused by the movement of the outer rim relatively to the inner rim, the bows of the spring units or the flat springs 7 and 8 will assist very materially in holding the outer rim in the plane of the wheel, or of the inner portion, when the machine to which the wheels have been applied is turning a corner, and the lateral pressure of the vehicle has a tendency to make the wheels "skid" or slide upon the ground. The springs 24 will also assist in this movement, but not to such a great extent, but which is increased by placing them in alinement with each other transversely of the plane of the wheel.

If at any time any of the units becomes defective or it is desired to remove it for any reason, the nuts 27 on the two bolts 11 are quickly removed when the unit may be slipped out from between the two rims, and especially as the parts comprising the same can be readily separated for such purpose, if necessary. A new element can then be substituted for the defective one and the wheel becomes as effective as before, or if it be necessary the units around the wheel may be placed closer together and an additional unit can be inserted for increasing the strength or rigidity of the wheel.

As the shoulders 20 extend continuously around the rim, the correspondingly shouldered clamping means 21 can be set to any position thereon, thereby enabling adjustment of the spring devices around the rim.

When the outer rim moves with rotative relation to the inner rim, the pivot bars 22 swing on their pivots 23, so that the flat faces of the bars 22 are parallel with each other, and the bolts 25 of the opposing parts of rocking bars remain in alinement with each other, and thus do not cause any lateral deflection or buckling of the straight springs 24 which would be apt to occur if the bars 22 were not permitted to turn into parallel relation with each other upon the relative rotating movement of the inner and outer rims.

Having described my invention, I claim:—

1. In a spring wheel, two concentric rims at a distance apart, a plurality of spring devices therebetween, each spring device comprising a bow spring, rocking seats, a straight compressible spring mounted between the ends of the bow spring and seated with its ends on the rocking seats, and means on the rims pivotally supporting the rocking seats and the ends of the bow springs.

2. In a spring wheel, two concentric rims at a distance apart, a plurality of spring devices therebetween, each spring device comprising a bow spring, rocking seats, a straight spring portion mounted with its ends seated on the respective rocking seats, and means upon the rims having pivotal connection with the rocking seats and the ends of the bow springs.

3. In a spring wheel, two concentric rims at a distance apart, and a plurality of spring devices therebetween, each spring device comprising a bow portion and a straight portion between the arms of the bow portion, said bow portion having a sleeve at each end, a bushing sleeve within the sleeve of the bow portion, clamping means engaging each rim and a fastening bolt passing through said bushing sleeve for securing the bow portion to the clamping means and the clamping means to the rim.

4. In a spring wheel, two concentric rims at a distance apart, a plurality of spring devices therebetween, each spring device comprising a U-shaped portion and a straight portion between the arms of the U-shaped portion, and a set of clamping members for each spring device pivotally secured to the ends of the U-shaped portion, said clamping members adapted to clamp onto said rims, the straight portion of the spring device comprising coil springs between said clamping members, and bars secured to the ends of the coil springs, said bars being each pivoted in one of the said sets of clamping members.

5. In a spring wheel, two concentric rims at a distance apart, a plurality of spring devices therebetween, each spring device formed with a bow portion and with a straight portion between the arms of the bow portion, the bow portion of each spring device being provided with a sleeve at each end, a bolt through said sleeve, clamping members at the ends of said bolt, said clamping members being attached to the rims, the said straight portion comprising bars pivoted at each end to said clamping members, and yielding compression means between said bars.

6. In a spring wheel, two concentric rims at a distance apart, a plurality of spring devices connected therebetween, each spring device comprising a U-shaped portion, and a yielding straight portion extending between the ends of the U-shaped portion, clamping members clamping onto the said rims and pivotally supporting the U-shaped portion, said yielding straight member comprising compression means extending between the clamping members and normally extending radially to the axis of the wheel, said compression means being pivotally connected with the clamping members, whereby said clamping members and compression means may be moved out of such alinement.

7. In a spring wheel, two concentric rims at a distance apart each provided with a flange having its edges formed with a series of shoulders, and a plurality of spring devices between said rims, each spring device formed of a U-shaped portion and a yielding straight portion between the arms of said U-shaped portion, a set of clamping members for each spring device, the spring devices being pivoted to said clamping members, said clamping members clamping onto said rims and being recessed, and the bottom of each recess being shouldered to engage the shoulders of the aforesaid flanges.

8. In a spring wheel, two concentric rims at a distance apart, each provided on each edge with a series of shoulders, a plurality of spring devices between said rims, and clamping means for each spring device to secure the spring device in position on the rims, each clamping means provided with portions shouldered to engage the series of shoulders on the rims whereby the clamping means may be adjusted upon the rims.

9. In a spring wheel, two concentric rims at a distance apart, a plurality of bow springs therebetween, an elastic straight member extending between the ends of each bow spring, means for supporting the bow spring and elastic straight member on the rims comprising a supporting pivot for each end of the bow spring and a pivoted supporting means for each end of the elastic straight member, the pivots for said straight portion being substantially on a line with and between the pivots for the bow springs.

10. In a spring wheel, two concentric rims at a distance apart, a plurality of bow springs therebetween, an elastic straight member extending between the ends of each bow and comprising a longitudinally compressible spring and a rocking bar in engagement with each end thereof, and means pivotally supporting the rocking bars and bow springs on the rims, comprising a supporting pivot for each end of the bow springs and a pivotal support for each rocking bar, whereby the pivots of said bow spring and the axis of the straight portion may be thrown out of alinement.

11. In a spring wheel, two concentric rims at a distance apart, bow springs arranged between said rims, rocking bars between the ends of the bow springs, coil springs seated with their ends upon the rocking bars, and means pivotally supporting the rocking bars and bow springs on the rims, comprising a pivotal support for each rocking bar and a supporting pivot for each end of the bow springs.

12. In a spring wheel, two concentric rims at a distance apart, a plurality of spring devices therebetween, each spring device comprising a bow spring portion, straight compressible spring portions between the respective rims at the ends of the bow springs, and means for pivotally connecting the ends of the bow spring portions with the respective rims and for rockingly mounting the straight compressible spring portions at their ends on the respective rims, whereby said straight compressible spring portions are adapted to receive compression without distortion.

13. In a spring wheel, two concentric rims at a distance apart, lugs mounted on each rim, a plurality of spring devices between said rims, each spring device comprising a bow spring pivotally connected at its ends to said lugs on the rims, rocking seats pivotally connected to said lugs on the rims, and a straight compressible spring extending between the ends of each bow spring and seated with its ends on the rocking seats.

In testimony whereof, I have hereunto set my hand at Los Angeles, California, this 18th day of March 1908.

GEORGE H. WILLIAMS.

In presence of—
F. M. TOWNSEND,
FRANK L. A. GRAHAM.